(12) United States Patent
Lu et al.

(10) Patent No.: US 10,934,778 B2
(45) Date of Patent: Mar. 2, 2021

(54) BHA TRANSMISSION WITH LAMINATED RUBBER BEARINGS

(71) Applicant: Basintek, LLC, Houston, TX (US)

(72) Inventors: Jing Lu, Houston, TX (US); Peter Thomas Cariveau, Houston, TX (US)

(73) Assignee: Abaco Drilling Technologies, LLC, Houston, TX (US)

( * ) Notice: Subject to any disclaimer, the term of this patent is extended or adjusted under 35 U.S.C. 154(b) by 340 days.

(21) Appl. No.: 15/721,959

(22) Filed: Oct. 1, 2017

(65) Prior Publication Data

US 2018/0094489 A1    Apr. 5, 2018

Related U.S. Application Data

(60) Provisional application No. 62/402,686, filed on Sep. 30, 2016.

(51) Int. Cl.

| | |
|---|---|
| *E21B 4/00* | (2006.01) |
| *E21B 17/046* | (2006.01) |
| *F16D 3/68* | (2006.01) |
| *F16C 32/00* | (2006.01) |
| *F16D 1/10* | (2006.01) |

(52) U.S. Cl.
CPC ............ *E21B 4/003* (2013.01); *E21B 4/006* (2013.01); *E21B 17/046* (2013.01); *F16C 32/00* (2013.01); *F16D 3/68* (2013.01); *F16D 1/10* (2013.01)

(58) Field of Classification Search
CPC ........ E21B 4/003; E21B 17/046; E21B 4/006; F16D 3/68; F16D 1/10; F16C 32/00
USPC ....... 464/11, 76, 83, 111, 120–124, 154–156
See application file for complete search history.

(56) References Cited

U.S. PATENT DOCUMENTS

| | | | |
|---|---|---|---|
| 1,112,869 A | 10/1914 | Tirrell | |
| 1,625,511 A | 4/1927 | Ungerer | |
| 2,760,359 A * | 8/1956 | Wildhaber | ............ F16D 3/2057 464/120 |
| 3,257,826 A * | 6/1966 | Peterson | ................... F16D 3/68 464/76 |
| 4,565,541 A | 1/1986 | Obrecht | |
| 4,772,246 A | 9/1988 | Wenzel | |

(Continued)

FOREIGN PATENT DOCUMENTS

SU         1434165 A1      10/1988

*Primary Examiner* — Greg Binda
(74) *Attorney, Agent, or Firm* — Zeman-Mullen & Ford, LLP

(57) ABSTRACT

A torque transmission comprising input and output shaft adapters. Pins disposed on an outer surface of the input shaft adapter. Each pin provides a curved pin portion oriented generally perpendicular to the input shaft adapter's longitudinal axis. The output shaft adapter provides a recess with a plurality of receptacles (or "notches") formed in the recess's periphery, wherein the recess is shaped and sized such that when the input shaft adapter is received inside the recess, each pin is received into a corresponding notch. The torque transmission further comprises torsional bearings interposed between the pins and the notches, each torsional bearing providing a curved laminate portion such that the curved laminate portions contact the curved pin portions when the pins are received into their corresponding notches. The torsional bearings may further provide flat laminate portions that contact the notch when the pins are received into the notches.

20 Claims, 8 Drawing Sheets

(56) References Cited

U.S. PATENT DOCUMENTS

| | | | |
|---|---|---|---|
| 5,000,723 | A | 3/1991 | Livingstone |
| 5,007,491 | A | 4/1991 | Ide |
| 5,052,501 | A | 10/1991 | Wenzel et al. |
| 5,078,650 | A | 1/1992 | Foote |
| 5,267,905 | A | 12/1993 | Wenzel et al. |
| 5,547,032 | A | 8/1996 | Wenzel |
| 5,704,838 | A | 1/1998 | Teale |
| 5,954,587 | A | 9/1999 | Jacob et al. |
| 6,042,479 | A | 3/2000 | Hopson et al. |
| 6,949,025 | B1 | 9/2005 | Kraus et al. |
| 7,186,182 | B2 | 3/2007 | Wenzel et al. |
| 8,033,920 | B1 | 10/2011 | Benson |
| 8,062,140 | B2 | 11/2011 | Wall et al. |
| 8,215,841 | B2 | 7/2012 | Wenzel |
| 8,894,497 | B2 | 11/2014 | Kim |
| 8,900,062 | B2 | 12/2014 | Nicol-Seto |
| 8,915,788 | B2 | 12/2014 | Foote et al. |
| 2010/0313692 | A1 | 12/2010 | Wenzel |
| 2015/0167399 | A1 | 6/2015 | Kuhn et al. |
| 2016/0040484 | A1 | 2/2016 | Underwood et al. |
| 2017/0045090 | A1 | 2/2017 | Kuhn et al. |
| 2017/0082152 | A1 | 3/2017 | LaGrange et al. |

\* cited by examiner

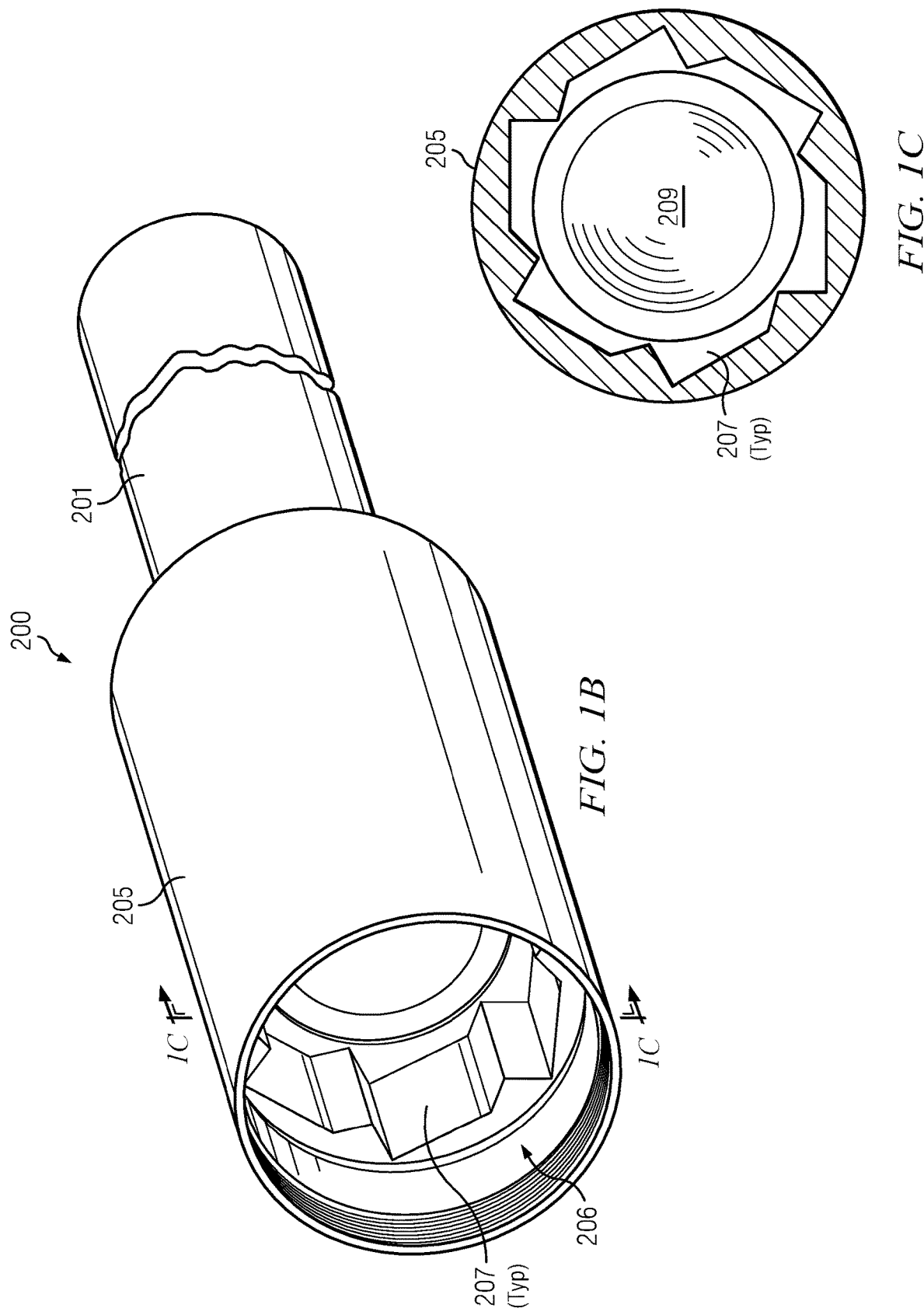

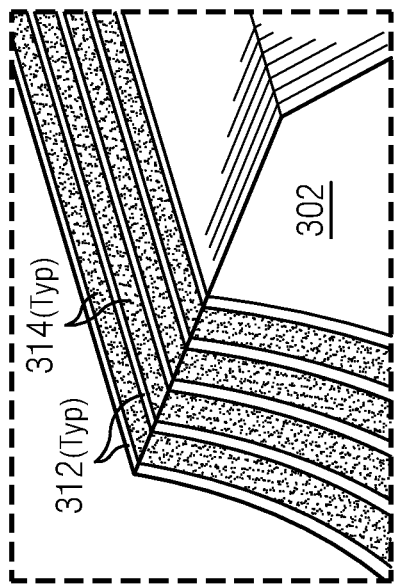
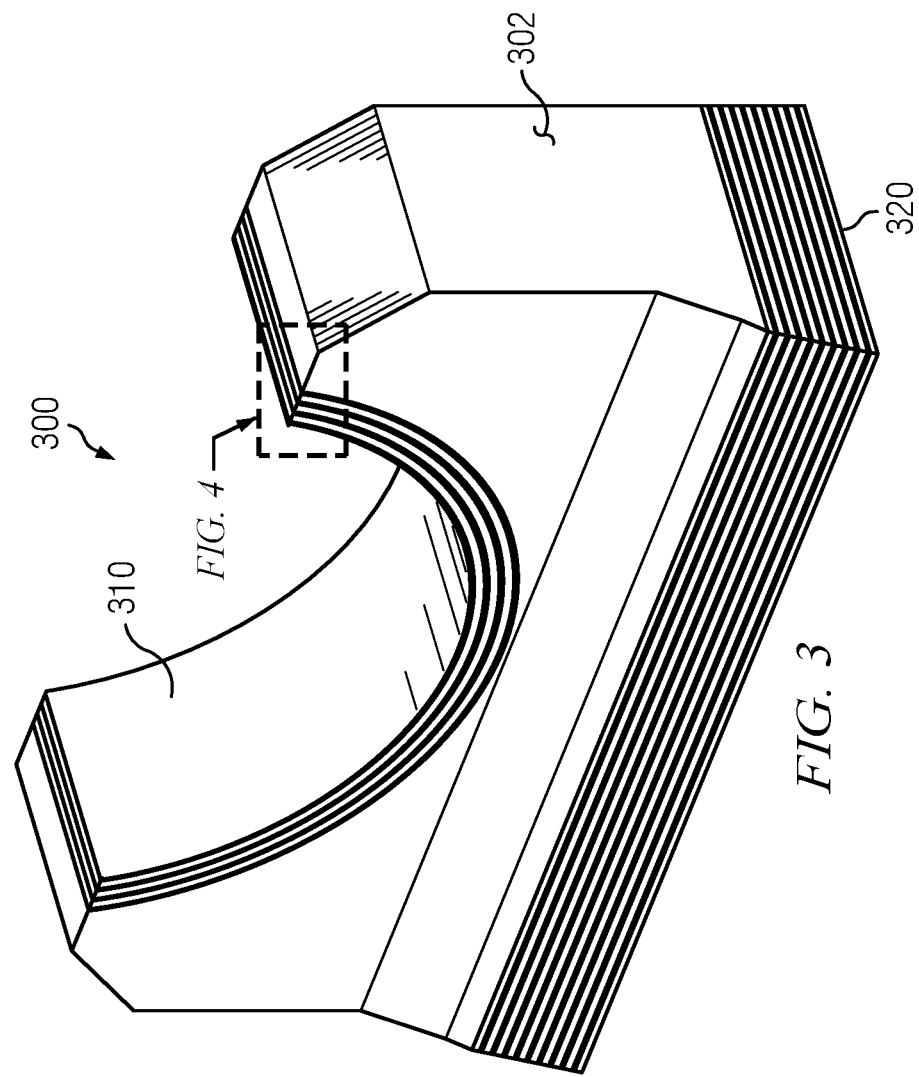

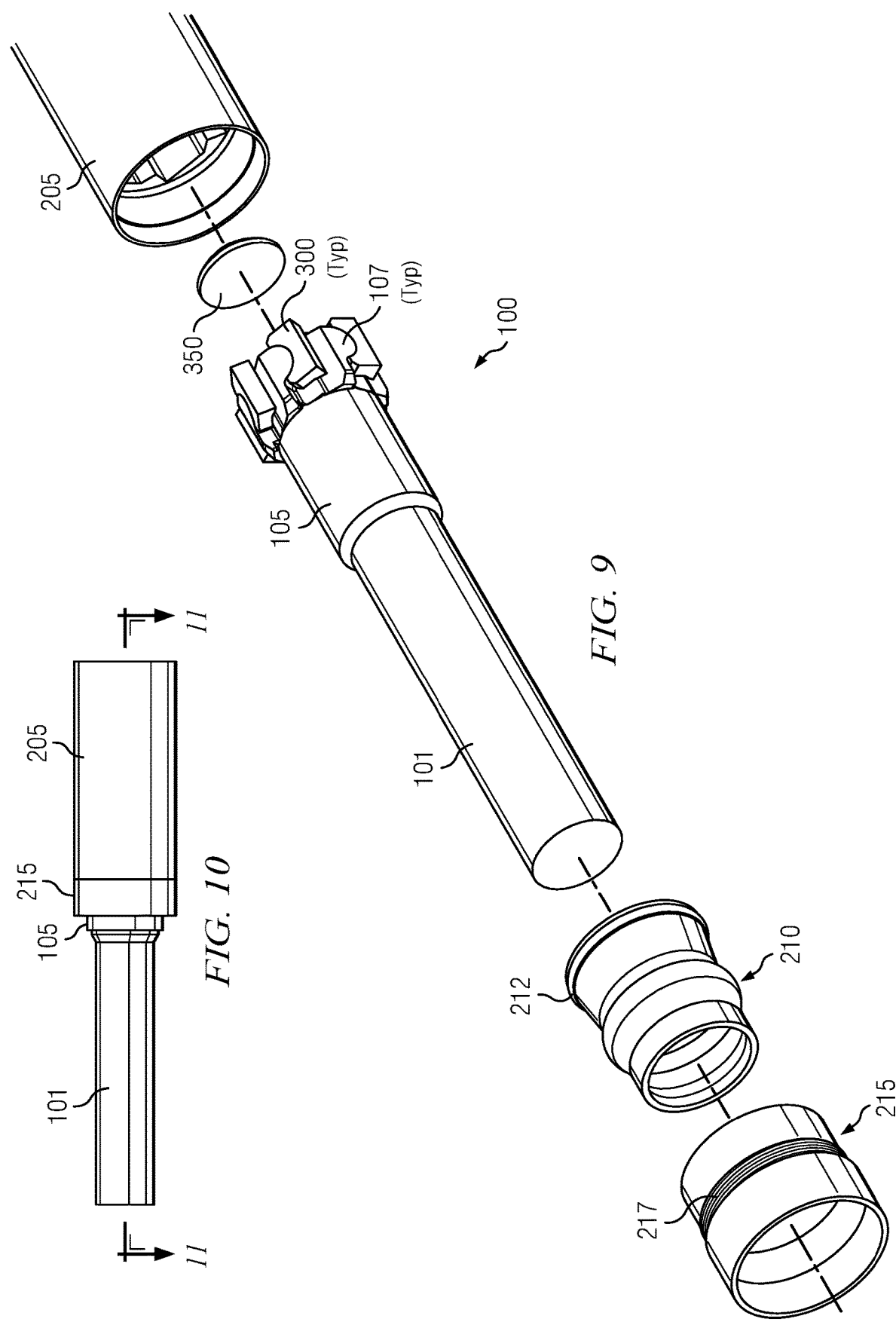

BHA TRANSMISSION WITH LAMINATED RUBBER BEARINGS

RELATED APPLICATIONS

This application claims the benefit of, and priority to, commonly-invented a commonly-assigned U.S. Provisional Patent Application Ser. No. 62/402,686, filed Sep. 30, 2016. The disclosure of 62/402,686 is incorporated herein by reference in its entirety.

FIELD OF THE DISCLOSURE

This disclosure is directed generally to rotary power transmission assemblies particularly adapted for use in bottom hole assemblies ("BHAs") in order to transfer torque generated by a subterranean positive displacement motor ("PDM") to, for example, a rotary drill bit. This disclosure is directed more specifically to such a transmission assembly using laminated rubber (or other elastomer) bearings.

BACKGROUND OF THE DISCLOSED TECHNOLOGY

It is well understood that bottom hole assemblies ("BHAs") include rotating power shafts that are necessarily misaligned by virtue of the BHA's design. For example, the rotation of the rotor in the PDM is eccentric and not concentric. This eccentric rotation of the rotor must be resolved into concentric rotation that will ultimately rotate the bit. Further, directional drilling in deviated wellbores necessarily causes misalignment of rotating power shafts in interconnected BHA components.

Specialized transmission sections designed for downhole applications (hereafter, "transmissions") transfer torque between such misaligned shafts. Conventionally, transmission designs resolve the misalignment between input/output shafts via contact between cooperating metal components on each of the input and output shafts. Torque is transferred from input shaft to output shaft through the metal-to-metal contact. However, in the harsh downhole work environment (and particularly under heavy torque load), the metal-to-metal contact surfaces can deteriorate rapidly, shortening the service life of the transmission. Notable effects causing such shortened service life include galling of the metal-to-metal contact surfaces and resulting fretting and general erosion of the metal.

There are several types of metal-to-metal transmissions known in the art. Constant Velocity (or CV) joint styles include: (1) ball bearing designs, in which torque is transferred via a pre-designed number of mating ball and socket couplings (typically 6 to 8); (2) spline designs, in which the cooperating metal surfaces have interlocking splines and receptacles; (3) woodruff key designs, in which torque is transferred via wedges, semicircles or other shapes; and (4) elliptical roller bearing designs, which are similar to ball bearing designs except with elongated ball and socket couplings (i.e. elliptical shapes) in order to provide more contact length in each coupling for better torque load distribution and transfer.

Other metal-to-metal transmission styles known in the art include: (1) flex shaft designs, in which an elongated input shaft resolves eccentric rotation into concentric rotation by flexing over its length; (2) flex shaft/CV joint combination and hybrid designs; and (3) knuckle joint designs, in which opposing tabs and slots interlock in a bending "knuckle" configuration to transfer torque with high sliding force contact and drilling mud exposure.

Even small amounts of fretting and other erosion can also cause loss of design kinematics, compromising the original design intent to transfer torque by distributed contact between multiple elements in the torsional bearing surfaces provided in the conventional CV transmission and knuckle designs described above. The loss in distributed bearing contact manifests itself as a corresponding loss in torque transfer efficiency, caused by such effects as a change of transmission angle and erratic torque transfer through the bearing surfaces. In such cases, conventional CV and knuckle joint transmissions with metal-to-metal bearings may perform differently from specification over time (and usually not as well). More specifically, the surfaces of the metal-to-metal torsional contacts become recessed away from the optimum 90 degree transmission angle and do not engage sliding surfaces at the same offset location or angle at which they were design to operate. This causes irregular engagement between surfaces and leads to stress concentrations not anticipated by original design considerations. Eventually, over time, the non-uniform wear of the metal-to-metal surfaces can cause transmission designs with two, three, four or more contacts to be driven by only one or two torsional bearing surfaces, especially during instantaneous dynamic movement. This leads to accelerated wear and lateral misalignment. The lateral misalignment will also cause an increased orbiting lateral force in the metal-to-metal spherical bearing. Under these loading conditions, the spherical thrust bearing element and/or the metal-to-metal bearing must take up orbiting transverse loads for which they are not designed.

As noted, all of the foregoing existing styles of transmission have service life issues caused, at least in part, by deterioration of the metal-to-metal contact interface(s). We are currently unaware of any BHA transmissions capable of transferring the high torque required in downhole service that do not rely on such metal-to-metal contact. There is therefore a need in the art for a transmission design that does not rely on metal-to-metal contact between input and output shafts.

SUMMARY AND TECHNICAL ADVANTAGES

These and other drawbacks in the prior art are addressed by a transmission providing a contact interface between an input shaft and output shaft, in which the input and output shafts are misaligned. It will be appreciated that in a BHA application, the input shaft may typically be connected to the rotor of a PDM, and the output shaft to a flex shaft/constant velocity (CV) joint as part of the linkage ultimately connecting to a rotating bit. The transmission provides an interlocking mechanism in which an input shaft adapter, on the end of the input shaft, is received into a recess in an output shaft adapter on the end of the output shaft. More specifically, shaped pins provided on the outer periphery of the input shaft adapter are received into shaped receptacles provided in the recess in the output shaft adapter. Shaped torsional bearings are also placed within the confines of the receptacle, interposed between the input shaft adapter pins and the side walls of the receptacle.

The torsional bearings are of a general high strength steel construction, and provide (1) a curved rubber/metal laminate portion to mate with curved bearing surface of the input shaft adapter pins, and (2) a flat rubber/metal laminate portion to bear on the side walls of the receptacle. When torque is applied to the input shaft, torque is transmitted to the output shaft through the torsional bearings. Specifically, the input shaft adapter pins bear upon the curved laminate portions of the torsional bearings, and the flat laminate portions of the torsional bearings bear on the side walls of the output shaft adapter receptacles.

The curved and flat laminate portions of the torsional bearings are made of alternating metal layer and rubber layer construction. The deployment of the torsional bearings between input shaft adapter pins and output shaft adapter receptacles is designed so that there is no relative movement between bearing surfaces during transmission of torque. That is, the design is such that there is no relative movement during transmission of torque: (1) between the contact surfaces of the input shaft adapter pins and the curved laminate portions on the torsional bearings, and (2) between the contact surfaces of the flat laminate portions on the torsional bearings and the side walls of the output shaft adapter receptacles. Advantageously, adhesive may be used on the contact surfaces during assembly and service to inhibit any relative movement. In this way, misalignment of input and output shafts through the disclosed transmission is taken up by flex of the elastomeric layers in the curved and flat laminate portions of the torsional bearings, obviating any metal-to-metal bearing contact and its associated drawbacks as described above in the Background section.

In a first aspect, therefore, this disclosure describes embodiments of a torque transmission comprising: an input shaft adapter having first and second ends and an input longitudinal axis, the first end of the input shaft adapter configured to mate with an input shaft, the second end of the input shaft adapter providing a plurality of pins disposed on an outer surface of the input shaft adapter, each pin providing a curved pin portion; an output shaft adapter having first and second ends, the second end of the output shaft adapter configured to mate with an output shaft, the first end of the output shaft adapter providing a recess formed therein; the recess providing a recess periphery, a plurality of notches formed in a the recess periphery, one notch for each pin disposed on the input shaft adapter, wherein the recess is shaped and sized to receive the second end of the input shaft adapter such that when the second end of the input shaft adapter is received inside the recess, each pin on the input shaft adapter is received into a corresponding notch on the recess; and a plurality of torsional bearings, a curved laminate portion provided on each torsional bearing; wherein one torsional bearing is interposed between one pin and one corresponding notch when the pins are received into their corresponding notches, such that the curved laminate portion contacts the curved pin portion.

The first aspect may also include embodiments in which the curved pin portions are oriented generally perpendicular to the input longitudinal axis.

The first aspect may also include embodiments in which selected torsional bearings each further comprise a flat laminate portion, each flat laminate portion contacting the notch when the pins are received into their corresponding notches.

The first aspect may also include embodiments in which each pin has a maximum pin nose diameter, and in which selected pin nose diameters are on a locus that coincides with an outer diameter of the output shaft.

The first aspect may also include embodiments in which selected curved laminate portions include metal and elastomer layers.

The first aspect may also include embodiments in which selected flat laminate portions include metal and elastomer layers.

The first aspect may also include embodiments further comprising: a spherical bearing, the spherical bearing including a spherical bearing laminate portion; and a tip, the tip provided on second end of the input shaft adapter; wherein, when the second end of the input shaft adapter is received inside the recess, the spherical bearing laminate portion is interposed between the tip and the recess.

The first aspect may also include embodiments in which the spherical bearing laminate portion includes metal and elastomer layers.

The first aspect may also include embodiments further comprising: a boot retainer, the boot retainer having first and second boot retainer ends; and an outer input shaft adapter periphery on the second end of the input shaft adapter and an outer output shaft adapter periphery on the first end of the output shaft adapter; wherein, when the second end of the input shaft adapter is received inside the recess, the boot retainer is received over the input shaft adapter and the output shaft adapter such that the first end of the boot retainer is affixed to the outer input shaft adapter periphery and the second end of the boot retainer is affixed to the outer output shaft adapter periphery.

The first aspect may also include embodiments further comprising: an outer output shaft adapter periphery on the first end of the output shaft adapter; a fill port connecting the outer output shaft adapter periphery to the recess; and an evacuate port connecting the outer output shaft adapter periphery to the recess.

The first aspect may also include embodiments further comprising adhesive bonding between at least one of the curved pin portions and curved laminate portions, and/or the flat laminate portions and notches, and/or the spherical bearing laminate portion and at least one of the tip and the recess.

The first aspect may also include embodiments in which selected pins each have a midpoint, and in which the curved pin portions on said selected pins each have a radius whose centerpoint coincides with the midpoint.

In a second aspect, this disclosure describes embodiments of a double knuckle transmission coupling, comprising: an input shaft having a first input shaft end and a second input shaft end, the second input shaft end having an input shaft slot defining an input shaft tongue and groove configuration; an output shaft having a first output shaft end and a second output shaft end, the first output shaft end having an output shaft slot defining an output shaft tongue and groove configuration; a plurality of arcuate tongue recesses, one arcuate recess formed in each tongue in the input and output shaft tongue and groove configurations; a center coupling element, the center coupling element including two pairs of knuckles, each knuckle providing an arcuate knuckle surface configured to be received within a corresponding arcuate tongue recess; a plurality of receptacles, one receptacle formed in each arcuate tongue recess; a plurality of torsional bearings, a curved laminate portion provided on each torsional bearing; wherein one torsional bearing is received into each receptacle, such that the curved laminate portions contact the arcuate knuckle surfaces when the knuckles are received within their corresponding arcuate tongue recesses.

The second aspect may also include embodiments in which selected torsional bearings each further comprise a flat laminate portion, each flat laminate portion contacting the receptacle when the selected torsional bearings are received into their corresponding receptacles.

It is therefore a technical advantage of the disclosed rubber laminate bearings to extend the service life of transmissions in which such rubber laminate bearings are deployed, as compared to conventional bearings having metal-to-metal contact. As noted above, even though the input shaft and output shaft are misaligned, there is no relative movement between bearing surfaces during torque transmission. Flex in the curved and flat laminate portions of the torsional bearings takes up and absorbs substantially all input/output shaft displacement due to shaft misalignment. The above-described disadvantages associated with galling and subsequent fretting/erosion of metal-to-metal bearings are thus substantially reduced, if not eliminated completely. Further, "constant velocity" contact in the torsional bearing surfaces in CV transmission style designs can be maintained over a more sustained period via flex in the disclosed torsional bearings (as opposed to deteriorating metal-to-metal contact), thereby extending the service life of such CV-style transmission designs over a conventionally expected service life.

Another technical advantage of the disclosed transmission is that flex in the rubber laminate bearings (both torsional and spherical) maintains design kinematics for the transmission, promoting efficient torque transfer per design through all torsional bearings during service, and efficient transfer of thrust loads through the misaligned input and output transmission shafts.

Another technical advantage of the disclosed transmission is that periodic maintenance and refurbishment of the transmission is optimized. In prior designs with metal-to-metal bearings, fretting, erosion and other service wear on and around the bearings cause larger metal components also to become periodically no longer serviceable, requiring their refurbishment or replacement along with the bearings themselves. Such larger metal components (such as housings, splined connections, etc.) are often expensive and time consuming to repair and replace. Serious deterioration of such larger metal components may even require the entire transmission to be retired from service prematurely. In the transmission described in this disclosure, however, absent extraordinary service events, only the torsional bearings will require periodic replacement. The absence of metal-to-metal contact in the disclosed transmission means that larger metal components in the input shaft adapter and the output shaft adapter should remain substantially unworn over an extended service life.

The foregoing has rather broadly outlined some features and technical advantages of the disclosed transmission design, in order that the following detailed description may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described.

BRIEF DESCRIPTION OF THE DRAWINGS

For a more complete understanding of the embodiments described in this disclosure, and their advantages, reference is made to the following detailed description taken in conjunction with the accompanying drawings, in which:

FIG. 1B is a perspective view of output shaft assembly 200;

FIG. 1C is a section as shown on FIG. 1B;

FIG. 3 is a perspective view of a torsional bearing 300;

FIG. 4 is an enlargement as shown on FIG. 3;

FIG. 9 is a partially exploded view of FIG. 1A (without the cutaway on FIG. 1A);

FIG. 10 is an elevation view of FIG. 1A (without the cutaway on FIG. 1A);

DETAILED DESCRIPTION

Figure 1A:
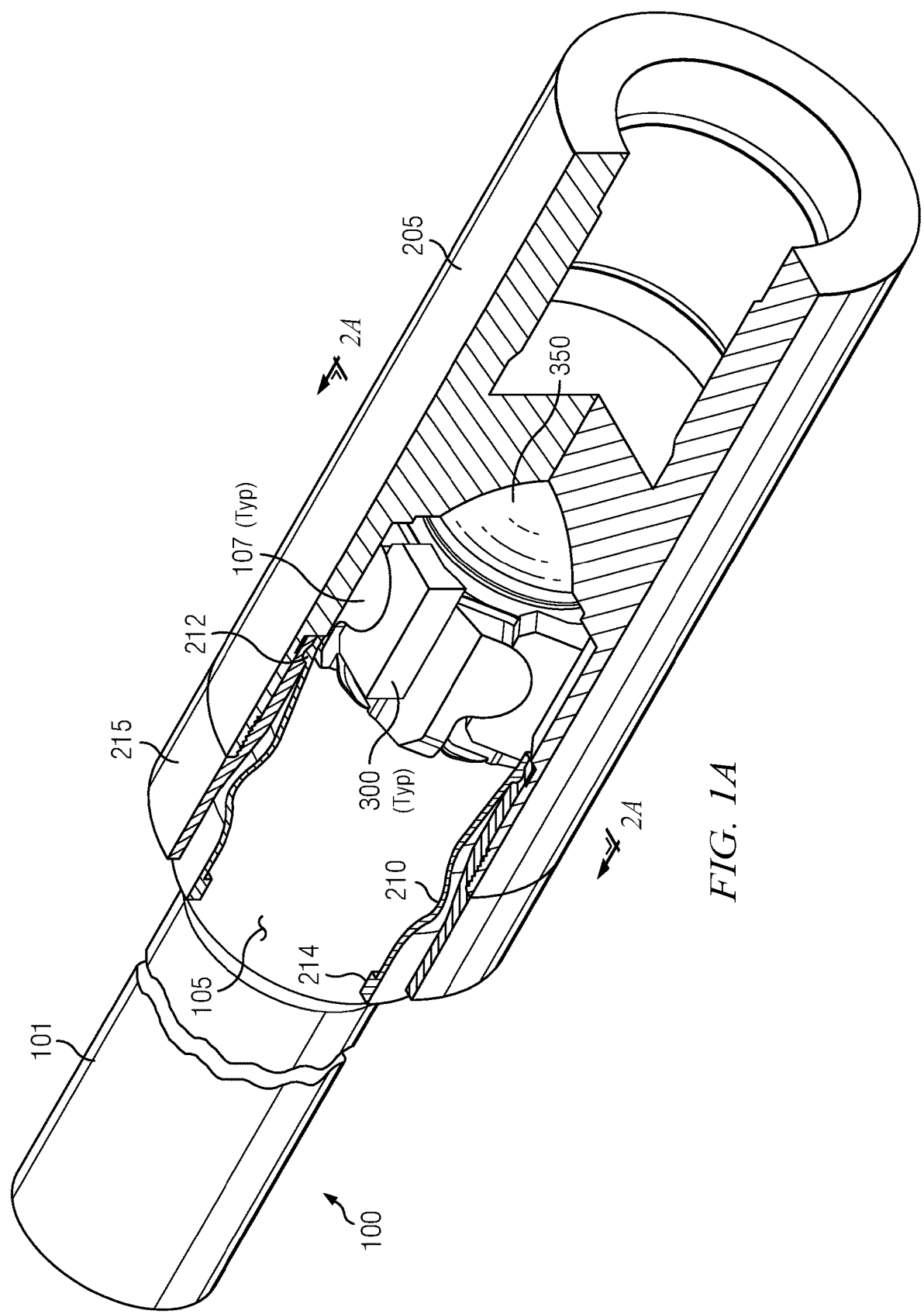
FIG. 1A is a perspective cutaway view of input shaft assembly 100 operationally engaged with output shaft adapter 205 according to an exemplary embodiment of the transmission described in this disclosure.

Reference is now made to FIGS. 1A through 12 in describing the currently preferred embodiments of the disclosed transmission. For the purposes of the following disclosure, FIGS. 1A through 12 should be viewed together. Any part, item, or feature that is identified by part number on one of FIGS. 1A through 12 will have the same part number when illustrated on another of FIGS. 1A through 12. It will be understood that the embodiments as illustrated and described with respect to FIGS. 1A through 12 are exemplary, and the scope of the inventive material set forth in this disclosure is not limited to such illustrated and described embodiments.

The scope of the inventive material set forth in this disclosure is further not limited to specific deployments of the described embodiments. For example, the following description makes reference to input shaft 101 operationally engaged with output shaft 201 via connection of input shaft assembly 100 to output shaft assembly 200. It will be appreciated that in a typical BHA deployment, input shaft 101 may be connected to the rotor in a PDM, and output shaft 201 may be connected to the flex shaft/CV joint above the rotary bit. The description below is not limited to such an exemplary deployment, however, and for this reason input and output shafts 101 and 201 are referred to generically throughout.

FIG. 1A is a perspective cutaway view of input shaft assembly 100 operationally engaged with output shaft adapter 205 according to an exemplary embodiment of the transmission described in this disclosure. With momentary reference to FIG. 8, and continuing reference to FIG. 1A, it will be seen that input shaft assembly 100 comprises input shaft 101 conventionally connected to input shaft adapter 105 via, for example a threaded connection. Input shaft adapter 105 provides a plurality of shaped pins 107 on a distal end thereof.

With reference now to FIGS. 1B and 1C, output shaft assembly 200 comprises output shaft 201 conventionally connected to output shaft adapter 205 via, for example a threaded connection. Output shaft adapter 205 provides a plurality of shaped receptacles 207 in an internal cylindrical recess 206. [Shaped receptacles 207 may also be referred to as "notches" in this disclosure.] Cylindrical recess 206 is formed on a distal end of output shaft adapter 205. With additional reference to FIGS. 1A and 2A, for example, it will be seen that cylindrical recess 206 is provided in output shaft adapter 205 to receive input shaft adapter 105. Further, as shown on FIG. 2A, and as will be described in detail further on this disclosure, receptacles 207/notches on output shaft adapter 205 are shaped to receive pins 107 on input shaft adapter 105 when torsional bearings 300 are interposed between pins 107 and side walls of receptacles 207. FIG. 1C also depicts spherical bearing receptacle 209 formed on the inside end of cylindrical recess 206. As will be discussed in greater detail with reference to FIGS. 5 through 7, spherical bearing receptacle 209 is shaped to receive spherical bearing 350 illustrated on, for example, FIGS. 1A, 5, 8 and 9.

Figure 11:
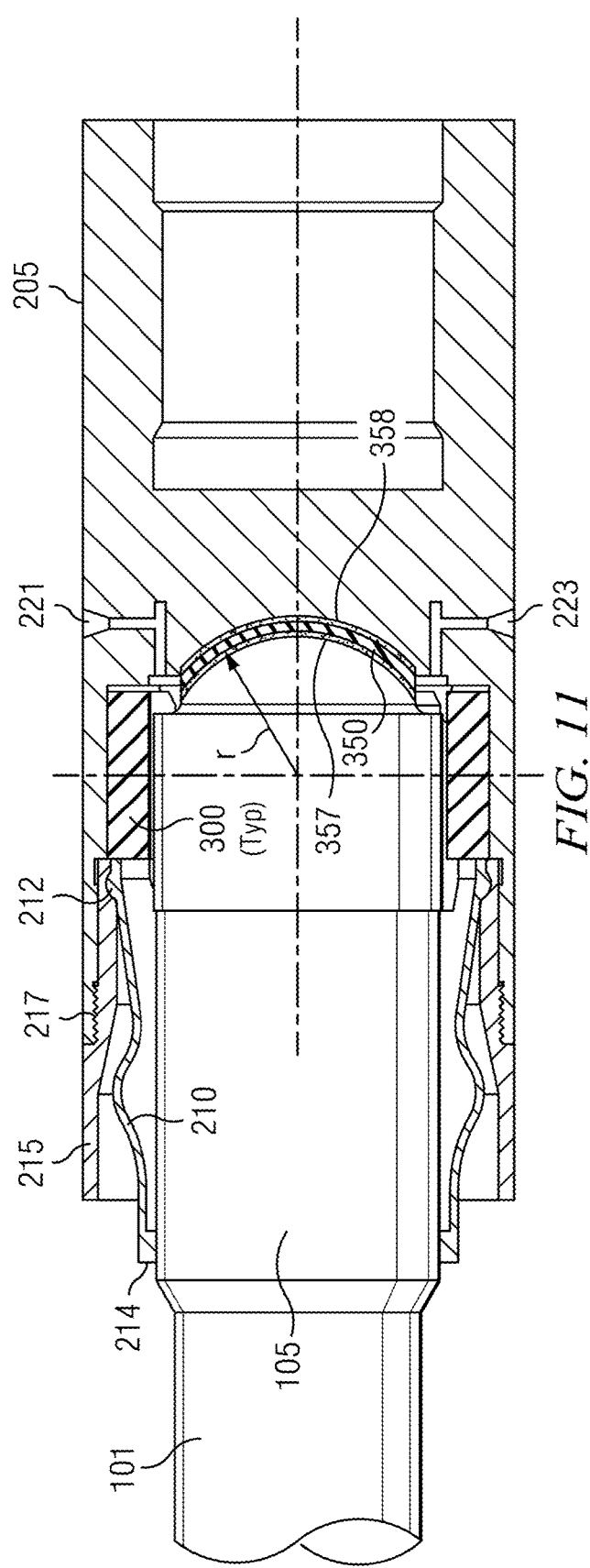
FIG. 11 is a section as shown on FIG. 10.

With reference to FIG. 1A again, and with further reference to FIG. 11, it will be seen that the connection between input and output shaft adapters 105 and 205 is protected by boot 210. Boot retainer 215 maintains and protects boot 210. Boot retainer 215 attaches to output shaft adapter 215 via threads 217. Metal strap 214 maintains one end of boot 210 in close contact with input shaft adapter 105. Seal lip 212 holds the other end of boot 210 to output shaft adapter 205. It will be therefore seen with reference to embodiments illustrated on FIGS. 1A and 11 that boot retainer 215 has first and second boot retainer ends, the first end towards input shaft 101 and the second end towards output shaft adapter 205. Input shaft adapter 105 has an outer input shaft adapter periphery on the second end thereof (towards output shaft adapter 205). Output shaft adapter 205 has an outer output shaft adapter periphery on the first end thereof (towards input shaft 101). When the second end of input shaft adapter 105 is received inside the recess provided by spherical bearing receptacle 209 in output adapter shaft 205, boot retainer 215 is received over input shaft adapter 105 and output shaft adapter 205 such that the first end of boot retainer 215 is affixed to the outer input shaft adapter periphery and the second end of boot retainer 215 is affixed to the outer output shaft adapter periphery. [Refer to description immediately above associated with FIG. 1C for further understanding of the recess provided by spherical bearing receptacle 209 in output adapter shaft 205].

Figure 2A:
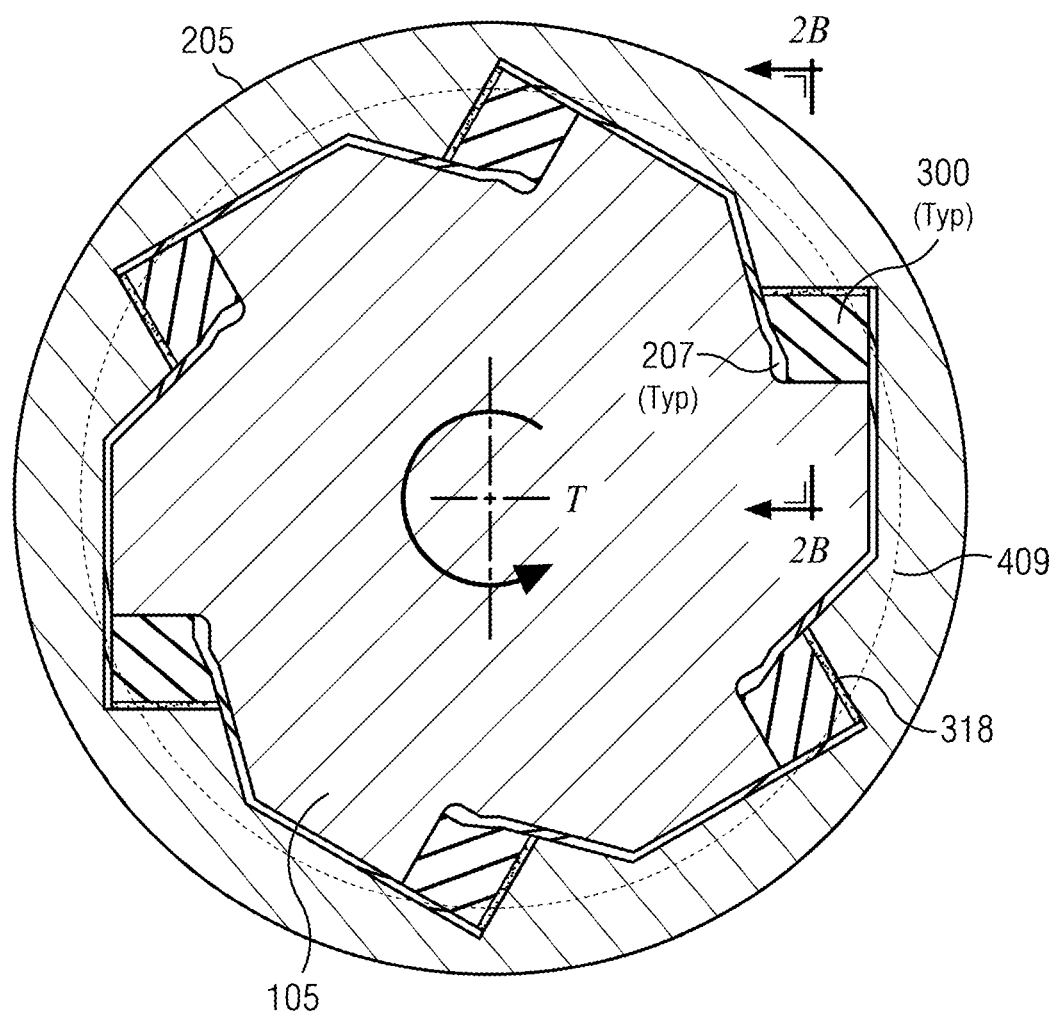
FIG. 2A is section view as shown on FIG. 1A.

FIG. 2A is a section as shown on FIG. 1A. When torque is provided to rotate input shaft adapter 105 in the direction of arrow T, input shaft adapter 105 engages torsional bearings 300 onto the side walls of the receptacles 207 provided in output shaft adapter 205. Torques is thus transferred to output shaft adapter 205.

Figure 2B:
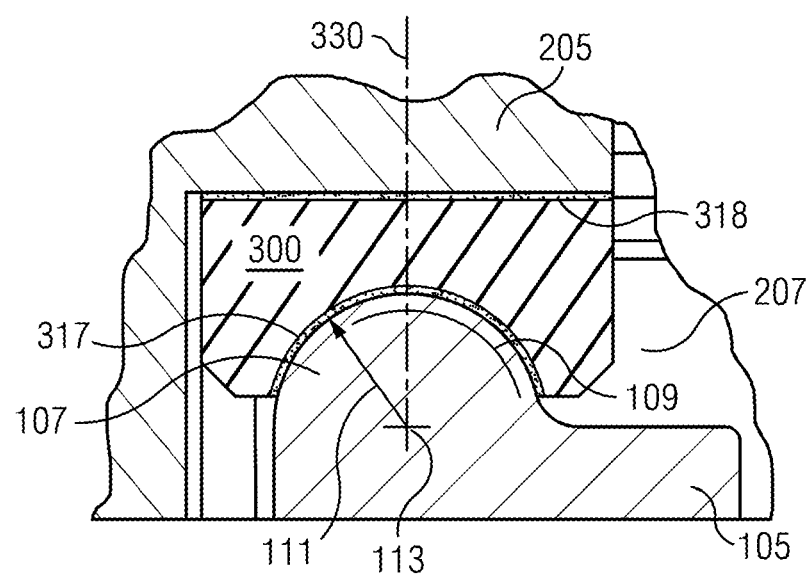
FIG. 2B is an enlarged section view as shown on FIG. 2A.

While the embodiment illustrated on FIG. 2A has six (6) torsional bearings 300, it will be appreciated that this number is exemplary only. The scope of this disclosure is not limited as to the number of torsional bearings provided in any embodiment. The number will be determined by user design factors such as, without limitation, size of input and output shafts 101 and 201, and amounts of torque to be transferred in view of stress performance of various constructions of torsional bearings 300. FIGS. 2A and 2B also depict that in some embodiments, adhesive bonding 318 may be provided between some or all of the flat laminate portions 320 of torsional bearings 300 and the shaped receptacles/"notches" 207 on output shaft adapter 205 (although the scope of this disclosure is not limited in this regard). Refer to description below associated with FIG. 3 for further understanding of flat laminate portions 320.

FIG. 2B is a section as shown on FIG. 2A. FIG. 2B shows that the engagement of torsional bearings 300 by input shaft adapter 105 is via curved portions of pins 107. With momentary reference to FIG. 3 (in which an exemplary torsional bearing 300 is depicted in more detail), it will be seen that the curved portions of pins 107 engage curved laminate portions 310 of torsional bearings 300. Returning now embodiments illustrated on FIG. 2B, it will be seen that in some embodiments, adhesive bonding 317 may be provided between some or all of the curved portions of pins 107 and the curved laminate portions 310 of torsional bearings 300 (although the scope of this disclosure in not limited in this regard). Also, with further reference to FIG. 2B, it will be seen that torsional bearing 300 has a midpoint 330 which coincides with a corresponding midpoint on selected pins 107. As shown on FIG. 2B, the curved portions on said selected pins 107 each have a radius 111 whose centerpoint 113 coincides with the midpoint 330.

With further reference now to FIGS. 2A and 2B, it will be appreciated that in currently preferred embodiments, the geometries illustrated are designed so that the maximum pin nose diameters 109 on pins 107 are on a locus 409 whose diameter coincides with the external diameter of output shaft 201 (such external diameter also illustrated on FIG. 2A as dotted line 409). In this way, in such currently preferred embodiments, torque is directly transferred through the full cross-section of output shaft 201, substantially unifying the torque stress gradients across output shaft 201 near the connection with output shaft adapter 205. It will nonetheless be appreciated, however, that the scope of this disclosure is not limited to deployments in which locus 409 of maximum pin nose diameters 109 coincides with the external diameter of output shaft 201.

FIG. 3 is a perspective view of a currently preferred embodiment of a torsional bearing 300 (also shown in situ on, for example, FIGS. 1A, 2A and 2B). Torsional bearings 300 are shaped to be received in an interposed relationship between pins 107 on input shaft adapter 105, and the side walls of receptacles 207 on output shaft adapter 205. In this interposed relationship, pins 107 contact a curved laminate portion 310 on torsional bearings 300. Curved laminate portion 310 is described in more detail below with reference to FIG. 4. The side walls of receptacles 207 contact a flat laminate portion 320 on torsional bearings 300. Curved laminate portion 310 and flat laminate portion 320 are separated by metal portion 302.

FIG. 4 is an enlargement as shown on FIG. 3. FIG. 4 illustrates curved laminate portion comprising alternating metal layers 312 and rubber layer 314. Although FIGS. 3 and 4 have been illustrated with a metal layer 312 as the immediate contact interface with pins 107 on input shaft adapter 105, this disclosure is not limited in this regard. Other embodiments may provide a rubber layer 314 as the immediate contact interface with pins 107. It has been found advantageous to provide a rubber layer 314 as the immediate contact interface with pins 107 in deployments where adhesive is used to adhere torsional bearings 300 to pins 107 during assembly.

Referring particularly to rubber layers 314 on FIG. 4, each rubber layer 314 is preferably less than 0.030" thick, and more preferably in the range of 0.015 to 0.002" thick, in order to maintain a beneficial compressive stress field throughout nearly the entire rubber layer during service. Although the scope of this disclosure is not limited to particular thicknesses of rubber layers 314, it has been found that thicknesses in the above guidelines tend to reduce the tendency of the rubber to extrude from the edge of curved laminate portion 310 when placed under load (compression, shear and some bending). The preferred layer thicknesses for rubber layer 314 may be obtained by highly precise calendaring operations during manufacture, using extremely stiff rolling cylinders to extrude the strip form of uncured "green" rubber. The preferred layer thicknesses may also be obtained by extrusion through a highly accurate and sharp strip die. The strip of "green" rubber may also be cured or semi-cured in the strip form prior to bearing assembly. This may be accomplished with an oven, autoclave or microwave heating. A microwave heating source is more preferred and can offer a continuous cure cycle. The strip may be cut to size and assembled into layers with the metal components.

Currently preferred embodiments customize rubber material selections for rubber layers 314. The selection of material for rubber layer will also dictate the exact preferred method of forming rubber layer 314 and bonding them to metal surfaces such as on metal layers 312. A high temperature rubber material such as fluorinated silicone rubber (FSR) is advantageous for extended use in transmissions whose service includes elevated bottom hole temperatures. In other embodiments, rubber material selections may be made from, for example, natural rubber (NR), nitrile butadiene rubber (NBR), hydrogenated nitrile butadiene rubber (HNBR), fluoroelastomers (FKM), perfluoroelastomers (FFKM), or ethylene propylene diene monomer (EPDM) rubber formulations.

Referring now to metal layers 312 on FIG. 4, each metal layer 312 is preferably a high strength carbon alloy steel or stainless steel, preferably with a yield strength in a range of 140 ksi to 230 ksi (higher strengths preferred for highly stressed metal layers 312). Metal layer thicknesses are preferably in a range of 0.001" to 0.030", and more preferably in a range of 0.002" to 0.015", although this disclosure is not limited in this regard. Further, the ratio of thicknesses of rubber layers 314 to metal layers 312 within curved laminate portion 310 is preferably in a range of 1.0 to 2.0, although again this disclosure is not limited in this regard. A currently preferred embodiment of curved laminate portion 310 has rubber layers 314 that are 0.002" thick, and metal layers 312 that are 0.002" thick.

Preferred thicknesses of metal layers 312 may be initially obtained from sheet rolling operations or thin film deposition techniques. Final forming of the metal layers 312 may be accomplished pressing with a suitable die. Metal layers 312 having thicknesses in the above preferred ranges will typically take the form of high strength foils. Examples of commercially available high strength foils that may be used for metal layers 312 include Integran Armor Foil, Integran Nickel-Cobalt Nano Foil, as well as traditional high-strength, heat-treated stainless steel 301 or 420 grade foil, all available from specialty suppliers such as Nikken Steel, Comet Metals, or Ulbrich Stainless Steels for example.

Curved laminate portion 310 on FIG. 4 may be formed by any conventional method, such as pressing metal layers 312 and rubber layers 314 together at elevated temperatures, and/or by bonding metal layers 312 and rubber layers 314 together with a suitable adhesive. Suitable conventional high temperature adhesives are commercially available from suppliers such as Cilbond, Lord (Chemlok brand), and Dow Chemicals (Thixon and Megum brands). A suitable adhesive product may be chosen to suit the characteristics of the rubber/elastomeric material selected for rubber layers 314. For example, Chemlok 607 is a suitable adhesive for FSR material, while Chemlok 207 primer and Chemlok 6450 top coat is a suitable adhesive for NBR or HNBR. Optimized chemical formulas for such products coincide with the polymer families and compounding mixtures typically found for each category of rubber/elastomer material. The consistency of the adhesive bonding is optimized through heating and pressing steps in manufacture.

As noted above, curved laminate portion 310 on FIGS. 3 and 4 is shaped to mate with pins 107 on input shaft adapter 105. A series of conventional cylindrical press dies may be used to shape metal layers 314 to the designed curvatures. Dies with less curvature must be used for metal layers 314 further away from the interface with pins 107 in order to maintain an overall uniform radial thickness of the finished curved laminate portion 310. The total overall radial thickness of finished curved laminate portion 310 will advantageously be optimized for the operating parameters of the transmission being designed. However, it is expected that curved laminate portions 310 deployed in many applications will have overall radial thicknesses in a range from 0.030" to 0.250".

Construction of curved laminate portion 310 is conventional. Calendared rubber layers 314, in strip form, are interposed between calendared metal layers 312, each rubber layer 314 having initially been cut to a suitable length and width to cover the interface between each adjacent metal layer 312. The length of rubber layers 314 may be the same or slightly longer than the arc length of the adjacent metal layers 312. The assembled metal and rubber layers 312 and 314 may be held together with adhesive, if desired, and then placed into a forming mold. An adhesive may be particularly desirable if rubber layers 314 were pre-cured prior to assembly. The assembly is then heated and cured in the mold, under pressure, to activate the final rubber curing and bonding reactions of the rubber and adhesive systems.

Referring now to FIG. 3, torsional bearing 300 also provides flat laminate portion 320. As noted above, torsional bearings 300 are shaped to be received in an interposed relationship between pins 107 on input shaft adapter 105, and the side walls of receptacles 207 on output shaft adapter 205. In this interposed relationship, the side walls of receptacles 207 contact flat laminate portion 320. It will be appreciated from FIG. 3 that flat laminate portion 320 is comprised of metal layers and rubber layers similar to metal layers 312 and rubber layers 314 within curved laminate portion 310.

The disclosure immediately above describing currently preferred materials and construction of curved laminate portion 310 applies similarly to the corresponding currently preferred materials and construction of flat laminate 320. Rectangular metal layers can be cut from metal foils using cutting dies, laser or other conventional foil cutting techniques. Calendared rubber in strip form is cut to size to give optimum coverage and overlap of the metal layers. An adhesive may be used to assemble alternating rubber and metal layers. The assembly is loaded into a mold and cured under heat and pressure.

Regarding thicknesses in flat laminate 320, the disclosure above describing currently preferred thicknesses of metal layers 312 and rubber layers 314 in curved laminate portion 310 applies equally to the currently preferred thicknesses of corresponding metal and rubber layers in flat laminate 320. As to overall laminate thickness of flat laminate 310, thicknesses in the range of 0.020" to 0.250" are preferred, although the scope of this disclosure is not limited in this regard.

Referring again to FIG. 3, metal portion 302 on torsional bearing 300 separates curved laminate portion 310 and flat laminate portion 320. Metal portion 302 is made from a conventional high strength plain carbon steel such as high strength grade 4340, or a high strength low alloy steel such as 300M. Alternatively, a high strength martensitic alloy steel may be used, such as Aermet 100.

It will be seen from FIGS. 3 and 2A that the side elevation of torsional bearing 300 is shaped to be received into output shaft adapter receptacles 207 by virtue of a generally asymmetric trapezoidal profile that includes flat laminate portion

320. Such asymmetric trapezoidal profile achieves several advantages, including (1) maximizing the cross-sectional area of flat laminate portion 320 so as to transmit and distribute torque through torsional bearing 300 with reduced compressive stress and shear stress on the materials in the construction of flat laminate portion 320, and (2) creating a self-immobilizing "dovetail" shape when retained in output shaft adapter receptacles 207 by input shaft adapter pins 107 (see FIGS. 2A and 2B).

As noted above in the "Summary" section, and with reference to FIGS. 1A and 1B, even though the input shaft 101 and output shaft 201 are misaligned in service, there is no relative movement during torque transmission between (1) contact surfaces between pins 107 and curved laminate portions 310, and (2) contact surfaces between flat laminate portions 320 and receptacles 207. Flex in the curved and flat laminate portions 310 and 320 of torsional bearings 300 takes up and absorbs substantially all relative displacement of input shaft 101 and output shaft 201 due to shaft misalignment. To that end, embodiments may provide curved and flat laminate portions 310 and 320 that are bonded with adhesive to their corresponding bearing surfaces on pins 107 and receptacles 207. Suitable adhesives are described above in the discussion of the construction of torsional bearings 300.

Figure 5:
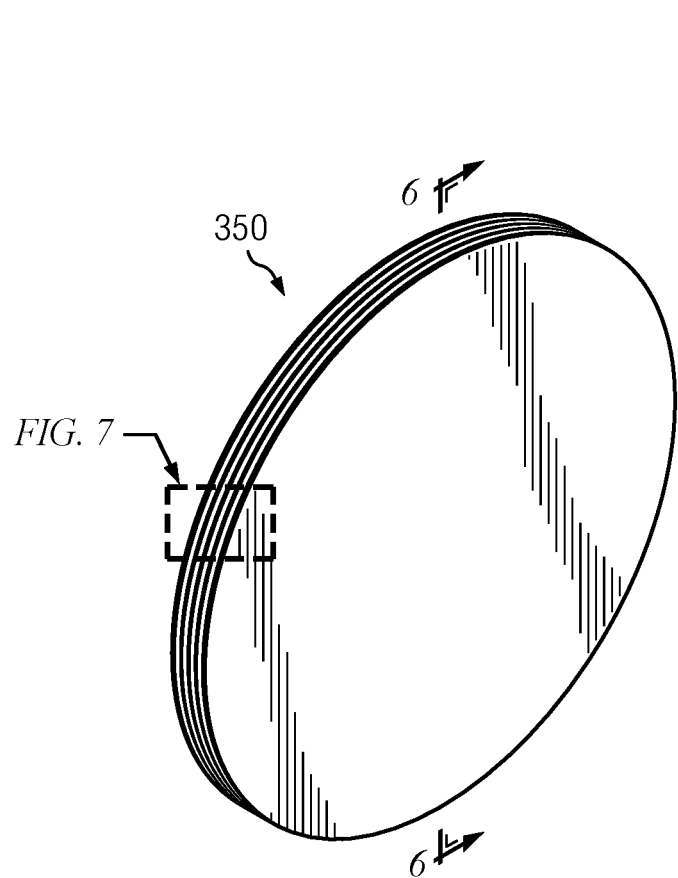
FIG. 5 is a perspective view of spherical bearing 350.

FIG. 5 is a perspective view of spherical bearing 350. With momentary reference to FIGS. 1A through 1C, it will be seen that spherical bearing 350 acts as thrust bearing, absorbing compressive and shear forces at the point at which the tip of input shaft adapter 105 contacts output shaft adapter 205 inside cylindrical recess 206. Spherical bearing receptacle 209 is provided inside output shaft adapter 205, and is positioned and shaped to mate with spherical bearing 350 when input shaft adapter pins 107 and torsional bearings 300 are fully received and operationally engaged within output shaft adapter receptacles 207.

FIG. 5 depicts spherical bearing 350 as a dome-shaped laminate of alternating metal and rubber layers. More colloquially, preferred embodiments of spherical bearing 350 have a general "contact lens" shape. With momentary reference to FIGS. 1A and 1B, for example, spherical bearing 350 allows a large thrust load to be transmitted through from input shaft assembly 100 to output shaft assembly 200 while also allowing a small angle of deflection. It will be appreciated that spherical bearing 350 obviates metal-to-metal contact between the tip of input shaft adapter 105 and output shaft adapter 250 responsive to the thrust load.

Figure 7:
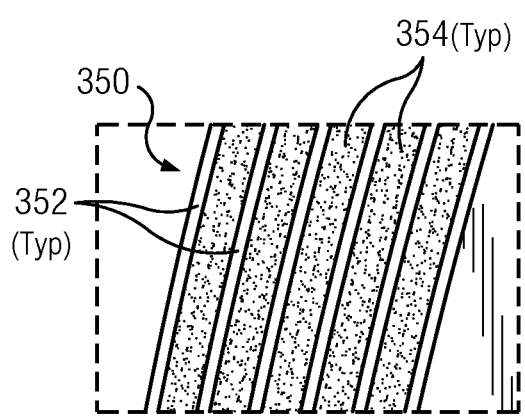
FIG. 7 is an enlargement as shown on FIG. 5.
Figure 6:
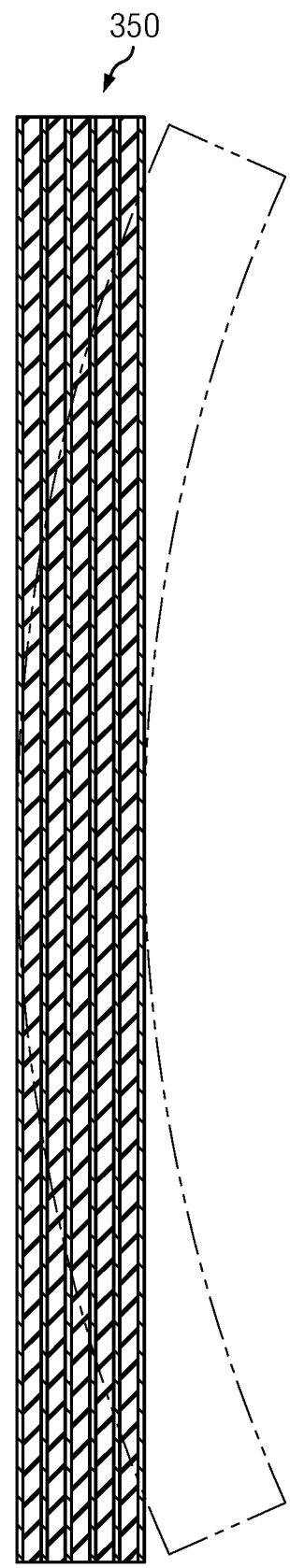
FIG. 6 is a section as shown on FIG. 5.

Spherical bearing 350 is similar in materials and construction to curved and flat laminate portions 310 and 320 on torsional bearings 300, as described above. FIG. 6 is a section as shown on FIG. 5, and illustrates preferred embodiments of spherical bearing 350 to be of substantially uniform laminate thickness. FIG. 7 is an enlargement as shown on FIG. 5, and depicts spherical bearing 350 to comprise alternating metal layers 352 and rubber layers 354. As described above with respect to metal layers 312 and rubber layers 314 on torsional bearings 300, FIG. 7 depicts a metal layer 352 as the immediate contact interface with input shaft adapter 105 on one side, and with spherical bearing receptacle 209 on the other side. Other embodiments may provide a rubber layer 354 as the immediate contact interface on either or both sides. It has been found advantageous to provide rubber layer 314 as the immediate contact interface with pins 107 in deployments where adhesive is used to adhere spherical bearing 350 to input shaft adapter 105 and/or spherical bearing receptacle 209 during assembly.

Currently preferred embodiments of individual metal layers 352 and rubber layers 354 on spherical bearing 350 may preferably have individual thicknesses consistent with the thickness ranges described above with respect to metal layers 312 and rubber layers 314 on torsional bearings 300, although the scope of this disclosure is not limited in this regard. Currently preferred embodiments of overall laminate thicknesses of spherical bearing 350 are in the range of 0.040" to 0.500".

Currently preferred embodiments of individual metal layers 352 and rubber layers 354 on spherical bearing 350 may preferably be made of materials consistent with the materials and constructions described above with respect to metal layers 312 and rubber layers 314 on torsional bearings 300, although the scope of this disclosure is not limited in this regard. In currently preferred embodiments, fabrication of spherical bearings 350 utilizes a series of spherical dies where each individual metal layer 352 is pressed to a custom curvature in register with its neighboring metal layers 352, so that a uniform thickness of rubber layers 354 and a constant overall thickness can be maintained throughout spherical bearings 350. Rubber layers 354 can be pre-formed in a die press with suitable spherical curvature, or cut to a geometrical shape that avoids overlapping material folds during assembly.

It will be appreciated that similar to the discussion above with respect to torsional bearings 300, and with reference to FIGS. 1A and 1B, there is no relative movement during torque transmission between (1) contact surfaces between the tip of input shaft adapter 105 and spherical bearing 350, and (2) contact surfaces between spherical bearing 350 and spherical bearing receptacle 209, even though the input shaft 101 and output shaft 201 are misaligned in service. Flex in spherical bearing 350 takes up and absorbs substantially all relative displacement of input shaft 101 and output shaft 201 due to shaft misalignment and/or thrust load during service. To that end, embodiments may provide a spherical bearing 350 that is bonded with adhesive to its corresponding bearing surfaces on the tip of input shaft adapter 105 and spherical bearing receptacle 209. Suitable adhesives are described above in the discussion of the construction of torsional bearings 300.

Figure 8:
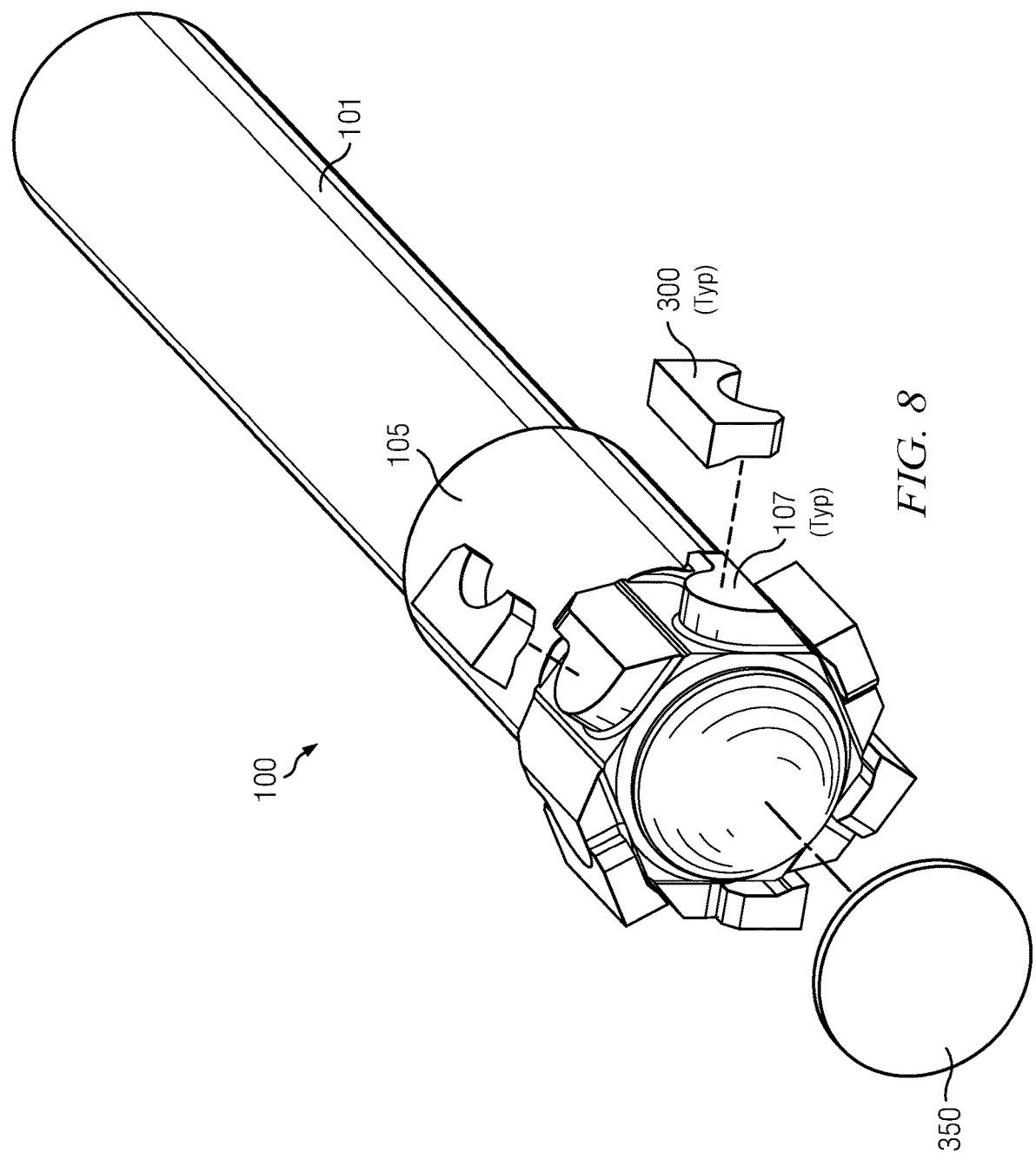
FIG. 8 is a partially exploded view of input shaft assembly 100 in isolation.

FIG. 8 is a partially exploded view of input shaft assembly 100, torsional bearings 300 and spherical bearing 350 immediately before (with reference to FIG. 1A) insertion into output shaft adapter 205 during assembly.

Figure 12:
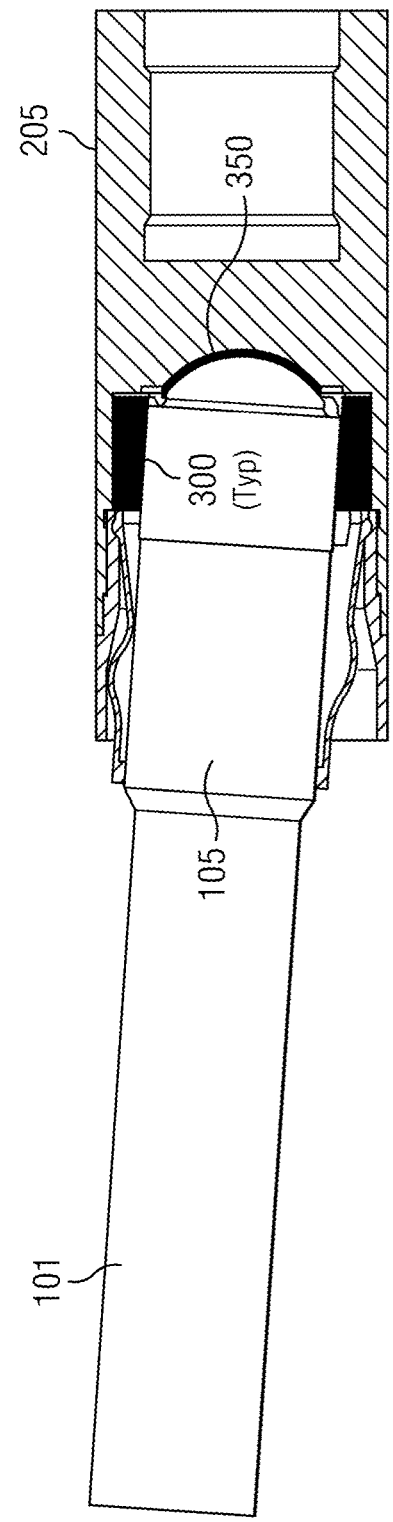
FIG. 12 is a modified version of FIG. 11 showing transmission misalignment.

FIG. 9 is a partially exploded view of FIG. 1A (without the cutout shown on FIG. 1A). FIG. 10 is an elevation view of FIG. 1A (without the cutout shown on FIG. 1A). FIG. 11 is a section as shown on FIG. 10, and FIG. 12 is a modified version of FIG. 11 showing transmission misalignment.

FIGS. 9 and 11 are useful to describe aspects of currently preferred assembly methods of the components shown on FIGS. 1A through 1C (and FIGS. 9 and 11). Boot retainer 215 and boot 214 are received over input shaft adapter 105. Note the smallest inside diameter of boot retainer 215 should be greater than max pin nose diameter 109 in order for boot retainer 215 to slide over. Boot retainer 215 and boot 210 are then moved temporarily down/along input shaft 101 while assembly continues. Alternatively, boot retainer 215 may be provided in two halves and assembled over input shaft 101 if the smallest inside diameter of boot retainer 215 is designed to be less than max pin nose diameter 109. Adhesive is applied as desired to the bearing surfaces of pins 107, curved laminate portions 310 of torsional bearings 300, receptacles 207, flat laminate portions 320 of torsional bearings 300, tip of input shaft adapter 105, spherical bearing 350 and spherical bearing receptacle 209. Input shaft assembly 100 is assembled (refer FIG. 8) and inserted into output shaft assembly 200. Pressure is applied before heating the assembled pieces to 300 deg F. for 30-90 mins to cure the adhesive.

With reference now to FIGS. 1A though 1C and FIGS. 9 and 11 again, boot 210 and boot retainer 215 are slid into position where seal lip 212 locks into its groove on boot retainer 215 and metal strap 214 is tightened down to hold boot 210 to input shaft adapter 105. Boot retainer 215 is screwed down onto output shaft adapter 205 via threads 217. It will be appreciated from FIG. 11 that when fully screwed down, boot retainer 215 forces the distal end of boot 210 (near seal lip 212) onto input shaft adapter 105. A suitable adhesive and/or an additional metal strap may also be used to secure the distal end of boot 210 to input shaft adapter 105. A suitable adhesive may also be applied to secure seal lip 212 to boot retainer 215.

FIG. 11 also illustrates radius "r" of spherical bearing 350. In currently preferred embodiments, "r" is selected to have a center point that coincides with the midpoint of pins 107 as deployed on input shaft adapter 105. FIG. 11 further illustrates fill port 221 and evacuate port 223 for lubricant in alternative embodiments in which input shaft assembly 100 and output shaft assembly are a sealed unit. See discussion of "variations" immediately below regarding such sealed unit embodiments. It will be therefore seen with reference to embodiments illustrated on FIG. 11 that output shaft adapter 205 has an outer output shaft adapter periphery on the first end thereof (towards input shaft 101). Fill port 221 connects the outer output shaft adapter periphery to the recess provided by spherical bearing receptacle 209 in output adapter shaft 205. [Refer to description above associated with FIG. 1C for further understanding of the recess provided by spherical bearing receptacle 209 in output adapter shaft 205.] Evacuate port 223 also connects the outer output shaft adapter periphery to the recess provided by spherical bearing receptacle 209 in output adapter shaft 205. Fill port 221 and evacuate port 223 may be sealed as required with suitable tapered pipe plugs. Evacuate port 223 may be used in conjunction with a conventional vacuum pump: (1) during filling through fill port 221, to evacuate lubricant chamber in order to vacuum-assist distribution of lubricant throughout the chamber, and (2) to remove lubricant from throughout the chamber during lubricant purge. FIG. 11 further illustrates that in some embodiments, adhesive bonding 357, 358 may be provided between at least one of: (1) the laminate portion of spherical bearing 350 and the tip provided by shaft adapter 105; and/or (2) the laminate portion of spherical bearing 350 and the recess provided by spherical bearing receptacle 209 in output adapter shaft 205 (although the scope of this disclosure is not limited in either of these regards).

FIG. 12 illustrates the flex of torsional bearings 300 and spherical bearing 350 during transmission misalignment.

Variations

Torsional bearings 300 and spherical bearings 350 are not limited to the rubber/metal designs described above with respect to currently preferred embodiments. Selected bearings could be solid bearings. Selected bearing materials could also include, without limitation, polymer, plastic or metals. Selected bearing shapes could also include, without limitation, flat, spherical, cylindrical or chevron shapes.

Currently preferred embodiments envisage three (3) to eight (8) torsional bearings 300 equally spaced around input shaft adapter 105. This disclosure is not limited in this regard, however, and any number of bearings could be deployed. Within currently preferred embodiments, four (4) to eight (8) pins are more preferred, with four (4) to six (6) pins used on 4.75" to 6.75" shaft sizes, and eight (8) pins used on larger sizes.

Embodiments of the disclosed transmission may run as a sealed assembly with grease or oil lubrication. Refer to disclosure above with reference to FIG. 11. Because the internal components are configured to avoid metal-to-metal sliding contact, however, other embodiments may be left unsealed, and may be further optimized for mud compatibility in such unsealed state.

Embodiments of the disclosed transmission may be combined with several types of thrust and tension socket devices to control the thrust load of the rotor. The scope of this disclosure is not limited in this regard. For example, and without limitation, a thrust surface and tension rod coupling could be provided instead of the spherical bearing 350 as received into spherical bearing receptacle 209 as described above.

Embodiments of the disclosed torsional bearings 300 may also be combined with other, alternative transmission designs transmitting torque between misaligned or angularly displaced shafts, such as, for example, universal joint designs, CV joint designs, claw joint designs or knuckle joint designs. Deployment of embodiments of the disclosed torsional bearings 300 on such alternative transmission design may provide advantages as described above in this disclosure, including improving the operational torque transfer efficiency and life cycle in such alterative designs.

In particular, without limiting the preceding paragraph, the double knuckle transmission coupling disclosed in U.S. Published Patent Application 2017/0045090 (applicant Lord Corporation of Cary, N.C., U.S.A) is considered highly suitable for modification to include embodiments of torsional bearings 300 as described in this disclosure. In this regard, the following Figures and paragraphs of the written specification of 2017/0045090 are incorporated into this disclosure by reference as if fully set forth herein: (1) FIGS. 2 through 21B of 2017/0045090; and (2) paragraphs 0004 through 0028, paragraphs 0038 through 0050, and paragraphs 0053 and 0054 of 2017/0045090.

For example, referring to FIGS. 6, 7, 8, 9, 11 and 12 in 2017/0045090 and associated narrative, the interfaces between couple center element 404 and input yoke 402/output yoke 406 may be adapted to receive embodiments of torsional bearings 300 as described in this disclosure. In more detail, arcuate recesses 432 on input yoke 402 and arcuate recesses 443 on output yoke 406 in 2017/0045090 may be adapted to provide shaped receptacles, and then torsional bearings 300 may be provided in such shaped receptacles. The curvatures on curved laminate portions 312 on torsional bearings 300 (referring to FIG. 3 herein) may preferably be selected to match corresponding curvatures on arcuate recesses 432, 443 on input yoke 402/output yoke 406 in 2017/0045090. Knuckles 411 on couple center element 404 will then bear on curved laminate portions 312 of torsional bearing 300 (referring to FIG. 3 herein) when input yoke 402, output yoke 406 and couple center element 404 are assembled. Resilient bearing contact could thereby be provided at the interfaces between couple center element 404 and input yoke 402/output yoke 406. Such an adaptation may thus provide many of the same advantages described above in this disclosure to the double knuckle coupling described in 2017/0045090. Further, the shaped receptacles provided in arcuate recesses 432, 443 in 2017/0045090 may receive torsional bearings 300 snugly such that flat laminate portions 320 on torsional bearings 300 (again referring to FIG. 3 herein) provide further resilient bearing contact between couple center element 404 and input yoke 402/output yoke 406.

Alternatively and/or additionally, laminated bearings may be provided at torque transfer interfaces between faces 416 on couple center element 404 in 2017/0045090 when couple center element 404 is received within slots 436, 439 on input yoke 402/output yoke 406.

Some embodiments of the adaptation described in the preceding paragraph (hereafter, "double knuckle coupling adaptation") may have contact surfaces adhesively bonded as described above in this disclosure. Some embodiments of the double knuckle coupling adaptation may be open to mud flow, and others may be protected from mud flow. Some embodiments of torsional bearings 300 deployed in the double knuckle coupling adaptation may have curved faces provided thereon, so that when received in the shaped receptacles, torsional bearings 300 are flush with the outer surfaces of input yoke 402 and output yoke 406. In some embodiments of the double knuckle coupling adaptation, torsional bearings 300 may be provided in all occurrences of the interfaces between couple center element 404 and input yoke 402/output yoke 406. In other embodiments, torsional bearings 300 may be provided in selected ones of such interfaces.

Although the inventive material in this disclosure has been described in detail along with some of its technical advantages, it will be understood that various changes, substitutions and alternations may be made to the detailed embodiments without departing from the broader spirit and scope of such inventive material as set forth in the following claims.

We claim:

1. A torque transmission, comprising:
    an input shaft adapter having first and second ends, the first end of the input shaft adapter configured to mate with an input shaft, the second end of the input shaft adapter providing a plurality of pins disposed on an outer surface of the input shaft adapter, each pin providing a curved pin portion;
    an output shaft adapter having first and second ends, the second end of the output shaft adapter configured to mate with an output shaft, the first end of the output shaft adapter providing a recess formed therein;
    a plurality of notches formed in a recess periphery of the recess, one notch for each pin disposed on the input shaft adapter, wherein the recess is shaped and sized to receive the second end of the input shaft adapter such that when the second end of the input shaft adapter is received inside the recess, each pin on the input shaft adapter is received into a corresponding notch on the recess;
    a plurality of torsional bearings, a curved laminate portion provided on each torsional bearing; and
    wherein one torsional bearing is interposed between one pin and one corresponding notch when the pins are received into their corresponding notches, such that the curved laminate portion contacts the curved pin portion; and
    wherein selected torsional bearings each further comprise a flat portion, each flat portion contacting the notch when the pins are received into their corresponding notches.

2. The torque transmission of claim 1, in which selected flat portions of the torsional bearings are laminated.

3. The torque transmission of claim 1, in which each pin has a maximum pin nose diameter, and in which selected pin nose diameters are on a locus that coincides with an outer diameter of the output shaft.

4. The torque transmission of claim 1, further comprising:
    a spherical bearing, the spherical bearing including a spherical bearing laminate portion; and
    a tip, the tip provided on second end of the input shaft adapter;
    wherein, when the second end of the input shaft adapter is received inside the recess, the spherical bearing laminate portion is interposed between the tip and the recess.

5. The torque transmission of claim 4, in which the spherical bearing laminate portion includes metal and elastomer layers.

6. The torque transmission of claim 4, further comprising adhesive bonding between the spherical bearing laminate portion and at least one of the tip and the recess.

7. The torque transmission of claim 1, in which selected curved laminate portions include metal and elastomer layers.

8. The torque transmission of claim 1, in which selected flat portions of the torsional bearings include a laminate comprising metal and elastomer layers.

9. The torque transmission of claim 1, further comprising:
    a boot retainer, the boot retainer having first and second boot retainer ends; and
    an outer input shaft adapter periphery on the second end of the input shaft adapter and an outer output shaft adapter periphery on the first end of the output shaft adapter;
    wherein, when the second end of the input shaft adapter is received inside the recess, the boot retainer is received over the input shaft adapter and the output shaft adapter such that the first end of the boot retainer is affixed to the outer input shaft adapter periphery and the second end of the boot retainer is affixed to the outer output shaft adapter periphery.

10. The torque transmission of claim 1, further comprising:
    an outer output shaft adapter periphery on the first end of the output shaft adapter;
    a fill port connecting the outer output shaft adapter periphery to the recess; and
    an evacuate port connecting the outer output shaft adapter periphery to the recess.

11. The torque transmission of claim 1, further comprising adhesive bonding between curved pin portions and curved laminate portions.

12. The torque transmission of claim 1, further comprising adhesive bonding between flat portions and notches.

13. The torque transmission of claim 1, in which selected pins each have a midpoint, and in which the curved pin portions on said selected pins each have a radius whose centerpoint coincides with the midpoint.

14. A torque transmission, comprising:
    an input shaft adapter having first and second ends and an input longitudinal axis, the first end of the input shaft adapter configured to mate with an input shaft, the second end of the input shaft adapter providing a plurality of pins disposed on an outer surface of the input shaft adapter, each pin providing a curved pin portion, wherein the curved pin portions are oriented generally perpendicular to the input longitudinal axis;
    an output shaft adapter having first and second ends, the second end of the output shaft adapter configured to mate with an output shaft, the first end of the output shaft adapter providing a recess formed therein;

the recess providing a recess periphery, a plurality of notches formed in the recess periphery, one notch for each pin disposed on the input shaft adapter, wherein the recess is shaped and sized to receive the second end of the input shaft adapter such that when the second end of the input shaft adapter is received inside the recess, each pin on the input shaft adapter is received into a corresponding notch on the recess; and a plurality of torsional bearings, a curved laminate portion provided on each torsional bearing;

wherein one torsional bearing is interposed between one pin and one corresponding notch when the pins are received into their corresponding notches, such that the curved laminate portion contacts the curved pin portion; and wherein selected torsional bearings each further comprise a flat portion, each flat portion contacting the notch when the pins are received into their corresponding notches.

15. The torque transmission of claim 14, in which selected flat portions of the torsional bearings are laminated.

16. The torque transmission of claim 14, in which selected flat portions of the torsional bearings include a laminate comprising metal and elastomer layers.

17. The torque transmission of claim 14, further comprising adhesive bonding between flat portions and notches.

18. A torque transmission, comprising:

an input shaft adapter having first and second ends, the first end of the input shaft adapter configured to mate with an input shaft, the second end of the input shaft adapter providing a plurality of pins disposed on an outer surface of the input shaft adapter, each pin providing a curved pin portion;

an output shaft adapter having first and second ends, the second end of the output shaft adapter configured to mate with an output shaft, the first end of the output shaft adapter providing a recess formed therein;

a plurality of notches formed in a recess periphery of the recess, one notch for each pin disposed on the input shaft adapter, wherein the recess is shaped and sized to receive the second end of the input shaft adapter such that when the second end of the input shaft adapter is received inside the recess, each pin on the input shaft adapter is received into a corresponding notch on the recess; and a plurality of torsional bearings, a curved laminate portion provided on each torsional bearing; and wherein one torsional bearing is interposed between one pin and one corresponding notch when the pins are received into their corresponding notches, such that the curved laminate portion contacts the curved pin portion;

wherein selected torsional bearings each further comprise a flat portion, each flat portion contacting the notch when the pins are received into their corresponding notches; and wherein each pin has a maximum pin nose diameter such that selected pin nose diameters are on a locus that coincides with an outer diameter of the outer shaft.

19. The torque transmission of claim 18, in which selected flat portions of the torsional bearings are laminated.

20. The torque transmission of claim 19, in which selected ones of the curved laminate portions and the laminated flat portions on the torsional bearings include metal and elastomer layers.

\* \* \* \* \*